UNITED STATES PATENT OFFICE.

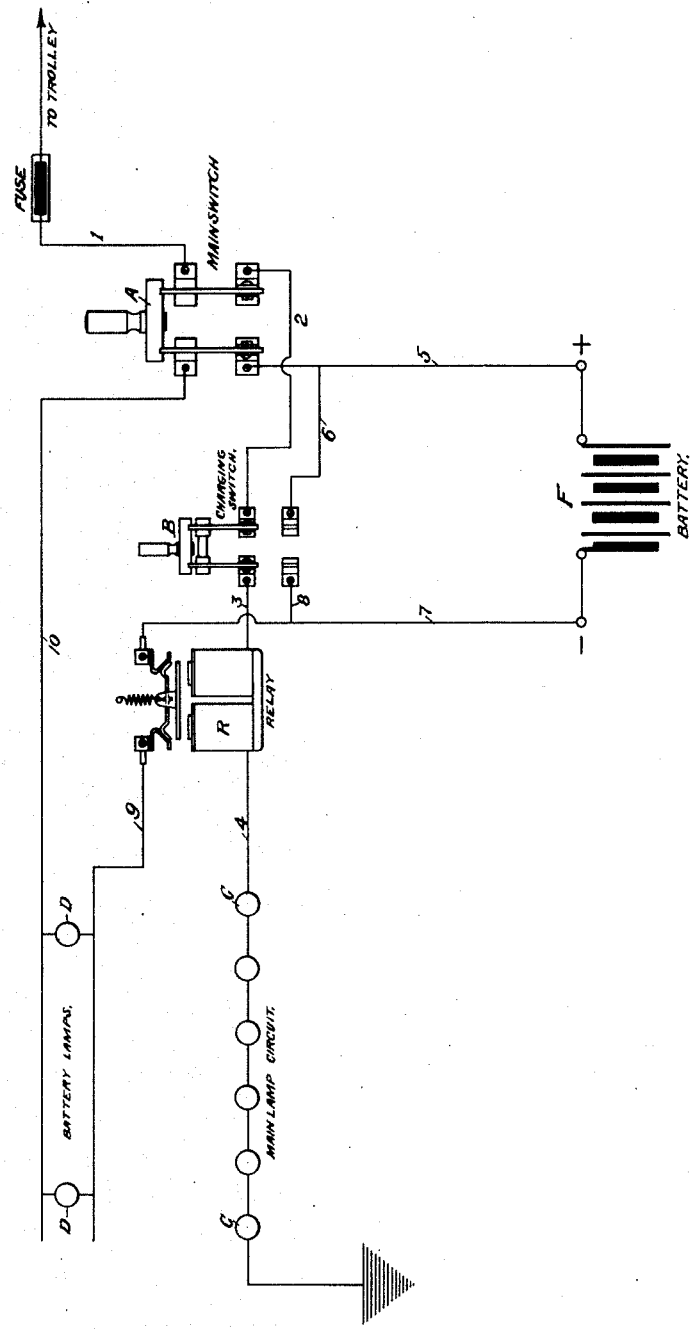

JAMES F. McELROY, OF ALBANY, NEW YORK, ASSIGNOR TO CONSOLIDATED CAR HEATING COMPANY, A CORPORATION OF WEST VIRGINIA.

LIGHTING AND BATTERY CIRCUITS.

976,743.  Specification of Letters Patent.  Patented Nov. 22, 1910.

Application filed April 29, 1910. Serial No. 558,319.

*To all whom it may concern:*

Be it known that I, JAMES F. McELROY, a citizen of the United States, residing at Albany, county of Albany, State of New York, have invented certain new and useful Improvements in Lighting and Battery Circuits, the following being a full, clear, and exact disclosure of the one form of my invention which I at present deem preferable.

For a detailed description of the present form of my invention, reference may be had to the following specification and to the accompanying drawing which illustrates my invention diagrammatically.

My invention is designed for lighting an apartment, particularly a railway car, either from a supply circuit as the normal mode, or temporarily from a storage battery operating a different set of lamps from those employed for the normal lighting.

In the accompanying drawing the circuit 1, 2, 3, 4 is the normal lighting circuit containing six main lamps C in series.

A is the main control switch acting on both the normal circuit and the battery circuit. B is the charging switch that also acts on the normal lighting circuit.

R is a relay in the aforesaid normal lighting circuit in series with the main lamps C and controlling the circuit containing battery lamps D which are of much lower voltage than lamps C and are also in multiple.

The storage battery is shown at F and its working circuit, when relay R is deënergized by failure of the normal circuit, is 7, 9, 10, 5. Its charging circuit, when switch B is turned down, is 1, 2, 6, 5, 7, 8, 3, 4, it being then included in the normal lighting circuit in series with the lamps C. By this means the battery which only operates the low-voltage battery lamps can be charged while the high voltage lamps C are in use without appreciably affecting them.

Only the battery portion of the battery-lamp circuit is included in the normal circuit for charging so that it will not be interfered with by the relay switch.

By opening switch A both the normal and the battery lighting circuits are broken; by closing it either the normal or the battery lamps will light up according as the normal supply is operative or interrupted and the relay R is in consequence energized or not.

What I claim as new and desire to secure by Letters Patent is:

1. The combination with a supply-circuit of a normal circuit therefrom, lamps in series therein, a battery-circuit, lamps in said battery-circuit, a switch in said normal circuit for closing the same and adapted to coöperate with the terminals of the battery portion of said battery-circuit to include the battery in the normal circuit in series with the lamps therein for charging, and a relay in the normal circuit for opening the lamp portion of said battery circuit.

2. The combination with a normal circuit, of a battery, a battery circuit, a switch in the latter circuit, a relay in the normal circuit and controlling said switch, and a charging switch having contacts in said former circuit and having also contacts in said latter circuit between said relay-controlled switch and the battery, whereby the battery may be included in the normal circuit for charging without interference from said relay.

3. The combination with a normal circuit containing lamps in series, of a battery circuit containing lamps in multiple, a common controlling switch for both circuits, a relay in the normal circuit controlling contacts located in said battery circuit between the battery and the lamps, and a switch normally closing the normal circuit but adapted to connect the two parts of the normal circuit on each side of itself with the respective battery terminals.

In witness whereof I have hereunto set my hand, before two subscribing witnesses, this 27th day of April, 1910.

JAMES F. McELROY.

Witnesses:
ERNEST D. JANSEN,
ROBERT McCOCHRANE.